United States Patent [19]
Safarzedeh-Amiri

[11] Patent Number: 5,266,214
[45] Date of Patent: Nov. 30, 1993

[54] PHOTOCATALYTIC METHOD FOR TREATMENT OF CONTAMINATED WATER

[75] Inventor: Ali Safarzedeh-Amiri, Ontario, Canada

[73] Assignee: Cryptonics Corporation, Ontario, Canada

[21] Appl. No.: 996,198

[22] Filed: Dec. 22, 1992

[51] Int. Cl.$^5$ .............................................. C02F 1/32
[52] U.S. Cl. ..................... 210/748; 210/755; 210/759; 210/763; 210/908; 210/909
[58] Field of Search ............... 210/748, 759, 755, 763, 210/908, 909

[56]  References Cited
U.S. PATENT DOCUMENTS

| | | | |
|---|---|---|---|
| 4,012,321 | 3/1977 | Koubek | 210/759 |
| 4,512,900 | 4/1985 | Macur et al. | 210/748 |
| 4,604,214 | 8/1986 | Carr et al. | 210/759 |
| 4,849,114 | 7/1989 | Zeff et al. | 210/748 |
| 4,861,484 | 8/1989 | Lichtin et al. | 210/748 |
| 5,043,079 | 8/1991 | Hallett | 210/748 |
| 5,043,080 | 8/1991 | Cater et al. | 210/908 |

OTHER PUBLICATIONS

Hatchard, C. G. et al., "A New Sensitive Chemical Actinometer II. Potassium Ferrioxalate as a Standard Chemical Actinometer", *Proc. Roy. Soc.*, vol. 235, (1956) pp. 518-536.

Baxendale, J. H. et al. "The Photolysis of Hydrogen Peroxide at High Light Intensities" *Trans. Farad. Soc.* vol. 52 (1957) pp. 344-356.

Walling, Cheves, "Fenton's Reagent Revisited" *Accounts of Chemical Research*, vol. 8, (1975) pp. 125-131.

Yamamoto, Y. et al. "Ozonation of Organic Compounds. 2. Ozonation of Phenol in Water", *J. Org. Chem.*, vol. 44, No. 13, (1979) pp. 2137-2142.

Lunak, S. et al. "Hydrogen Peroxide Photolysis, Mechanism of Photocatalytic Effect of Transition Metals", *Collection Czechoslovak Chem. Commun.*, vol. 48, (1983) pp. 3033-3040.

Zepp, R. G. "Hydroxyl Radical Formation in Aqueous Reactions (pH 3-8) of Iron (II) with Hydrogen Peroxide: The Photo-Fenton Reaction", *Environ. Sci. Technol.*, vol. 26, (1992) pp. 313-319.

Primary Examiner—Stanley S. Silverman
Assistant Examiner—Cynthia L. Nessler
Attorney, Agent, or Firm—Lowe, Price LeBlanc & Becker

[57] ABSTRACT

A method for treating an aqueous waste or groundwater containing organic contaminants.

14 Claims, 2 Drawing Sheets

PHOTOCATALYTIC METHOD FOR TREATMENT OF CONTAMINATED WATER

FIELD OF THE INVENTION

The invention relates to methods for treating contaminated wastes or groundwaters. More particularly, the invention relates to a process for removing organic contaminants by treatment with ferric oxalate and hydrogen peroxide in the presence of light.

BACKGROUND OF THE INVENTION

Many contaminated wastes and groundwaters contain organic pollutants which can be destroyed by hydroxyl radicals (*OH).

Hydroxyl radicals may be generated by a variety of reactions, including photolysis of hydrogen peroxide (J. H. Baxendale & J. A. Wilson, Trans. Farad. Soc. 52, 344, 1957), and Fenton's reaction, in which ferrous ion reacts with hydrogen peroxide to produce hydroxyl radical plus hydroxide ion (C. Walling, Acc. Chem. Res. 8, 125, 1976).

U.S. Pat. No. 5,043,080 discloses that when Fenton's reaction and photolysis of hydrogen peroxide are combined, there is a synergistic effect, giving a pollutant treatment process of enhanced efficiency. The wavelength of light and the ratio of metal ion to hydrogen peroxide were selected so that the major part of the UV light was absorbed by the hydrogen peroxide rather than the metal ions, while still allowing some absorption by the metal ions to regenerate the active form of the metal.

One of the drawbacks to this method is that in contaminated wastes of high inherent UV absorbance, light absorption by hydrogen peroxide, and therefore efficiency of treatment, can be seriously reduced.

There is also a limitation to the concentrations of contaminants that can be treated due to competitive absorption by byproducts.

Zepp et al. (Environ. Sci. Technol., (1992), vol. 26, p. 313) studied the generation of OH* resulting from the reaction of Fe (II) and $H_2O_2$ and employed photolysis of Fe (III) complexes, including Fe (III) oxalate, as a convenient means of generating Fe (II) for their studies. On the basis of their results, these authors proposed that oxidation of organics may occur naturally in the environment by the $H_2O_2$/Fe (II) pathway. Their studies did not indicate that generation of Fe (II) by photolysis of Fe (III) oxalate would provide a practical process for degradation of organic contaminants.

Lunak et al. (Collection Czech. Chem. Commun. (1983), Vol. 48, p. 3033) examined the effect of potassium ferrioxalate on photolytic decomposition of $H_2O_2$ as a means of determining the reaction mechanism of that photolysis. They observed that the ferrioxalate catalysed the decomposition of peroxide but they did not examine the potential of the process for oxidation of organics.

The processes described by these authors do not suggest that there is any advantage to be gained from employing the photolysis of ferric oxalate to generate Fe (II) for Fenton's reaction in the treatment of organic contaminants.

SUMMARY OF THE INVENTION

A method is provided for treating an aqueous waste or groundwater containing organic contaminants comprising
a) contacting the aqueous waste or groundwater at an acidic pH with effective amounts of hydrogen peroxide and ferric oxalate, and
b) irradiating the aqueous waste or groundwater with light to decompose the organic contaminants.

BRIEF DESCRIPTION OF THE DRAWINGS

For a better understanding of the present invention, reference will be made, by way of example, to the following drawings.

DETAILED DESCRIPTION OF THE INVENTION

Figure 1:
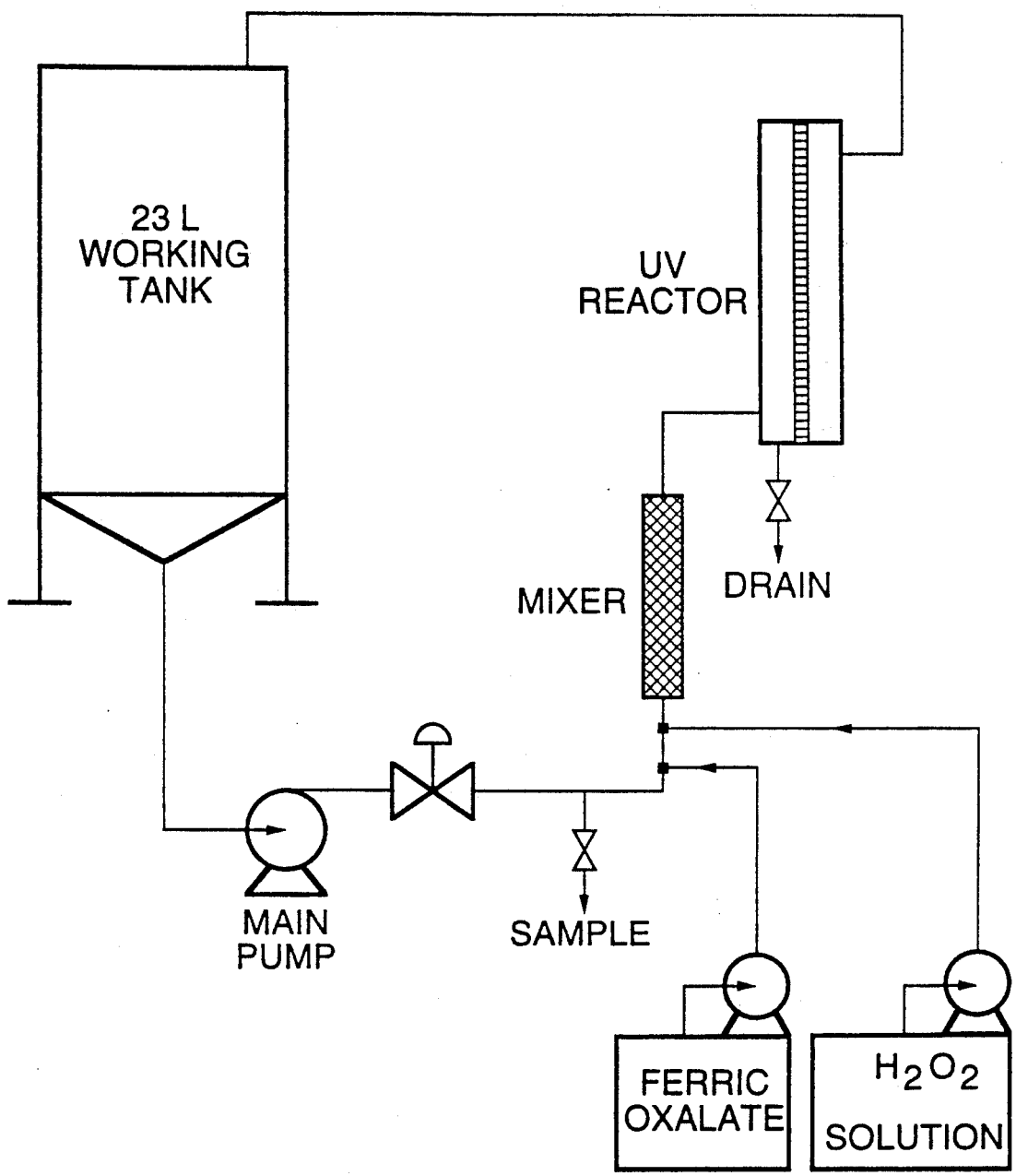
FIG. 1 is a schematic diagram of apparatus suitable for carrying out the process of the invention.

Ferric ion and oxalate at an acidic pH form complexes of various stoichiometries which absorb light across a wide range of wavelengths, from about 250 nm to around 580 nm (Hatchard et al., (1956), Proc. Roy. Soc. (London), vol. A 235, p. 518). The term "ferric oxalate" is used herein to include all complexes formed by reaction of ferric iron and oxalate. Ferric oxalate is known to photolyse with high quantum yield to give ferrous ion plus ferrous oxalate complexes the structure of which depends on the stoichiometry of the ferric oxalate (Hatchard et al., as above).

Ferric oxalate would not, however, suggest itself as a useful source of ferrous ions for use in a Fenton's reaction-based process for destruction of organic contaminants, in spite of its high quantum yield, as it would be assumed to be counter-productive to deliberately increase the carbon load in the system by adding an additional carbon compound such as oxalate along with the required iron.

This assumption is strengthened by previous work on the oxidative degradation of phenol by ozone, which showed that although the initial breakdown of the benzene ring by *OH proceeded at a satisfactory rate, oxalic acid accumulated (Yamamoto et al., J. Org. Chem. 44, 2137, 1979), suggesting that its further breakdown to $CO_2$ would be too slow to provide a practical process. Furthermore, the oxalate ion (free or complexed with iron) might be expected to act as a sink for *OH.

The present inventors have found, surprisingly, that when hydrogen peroxide and ferric oxalate are added to a waste or contaminated groundwater containing organic contaminants, and the solution is irradiated with light of wavelength range from about 200 to about 600 nm, a significantly improved rate of contaminant destruction is obtained compared with that in a system employing an inorganic iron compound as iron source.

Ferric oxalate may be prepared by reacting a suitable ferric salt, such as ferric sulfate, with oxalic acid or a suitable oxalate salt, as will be understood by those skilled in the art. Suitable salts include sodium and potassium oxalate.

The ferric salt and oxalate or oxalic acid may be added directly to the solution to be treated, to form ferric oxalate in situ or preferably may be reacted together apart from the treatment solution and added thereto, thereby avoiding any unwanted reactions of the ferric salts or the oxalic acid with components of the waste to be treated.

As will be understood by those skilled in the art, the rate of the process of the invention can be increased by increasing the concentration of ferric oxalate but this advantage of increased concentration has to be balanced against the cost of reagents and the applicable discharge requirements for iron.

In accordance with a preferred embodiment, iron is used at a concentration in the range of about 1 to about 100 pm and oxalate in the range of about 5 to about 500 ppm.

A molar ratio of oxalate : Fe (III) in the range of about 1:1 to about 3:1 is preferred. As can be seen in Example 4, higher ratios of oxalate produce a less efficient process.

As will be understood by those skilled in the art, a ferrous salt such as ferrous sulfate may be added to the solution to be treated instead of a ferric salt, as the ferrous ion, in the presence of hydrogen peroxide, will be converted to ferric ion which will generate ferric oxalate.

In accordance with a further embodiment of the invention, ferric oxalate is added initially in an effective amount based on the concentration of organic contaminants to be destroyed.

Alternatively, if contaminant levels are high and stringent iron discharge requirements have to be satisfied, advantage can be taken of the recycling of ferric ion which occurs in the process of the invention in order to minimise the iron load.

In accordance with a further embodiment of the invention, ferric oxalate is added initially in an amount consistent with the applicable iron discharge requirements and further oxalic acid or a suitable oxalate salt is added at intervals to restore an oxalate : Fe (III) ratio in the range of about 1:1 to about 3:1.

The added oxalic acid or oxalate salt complexes with Fe (III) regenerated by Fenton's reaction and the complex photolyses to repeat the cycle, the process being catalytic with respect to iron.

The inventors have found, for example, that further additions of oxalic acid or oxalate salt after exposure intervals of between 5 and 20 kW hrs/1000 gallons provides a process of good efficiency.

The $H_2O_2$ concentration employed will depend on the levels of pollutants and the COD of the waste or groundwater to be treated. An $H_2O_2$ concentration of at least twice the COD value is preferred, if COD reduction is desired.

Classes of organic contaminants which may be treated by the process of the invention include aromatic compounds, including aromatic hydrocarbons and substituted aromatic hydrocarbons, phenols and substituted phenols, substituted and unsubstituted alkanes, alkanes and alkynes, ethers and substituted ethers and ketones and substituted ketones.

The aqueous waste or groundwater is contacted with $H_2O_2$ and ferric oxalate at an acidic pH. A pH in the range of about 1 to about 5 is preferred and a pH in the range of about 2 to about 4 is especially preferred. Addition of the ferric oxalate to the waste or groundwater may bring the pH to the desired acidic range. In wastes of high alkalinity, however, it may be necessary to further adjust the pH by addition of acid after addition of ferric oxalate.

The method of the invention may be carried out at temperatures from about 0° C. to about 100° C., so long as the waste or groundwater is a liquid. It is convenient to carry out the method at ambient temperature.

The irradiation step of the method of the invention may employ light of a wavelength or wavelengths in the range of about 200 nm to about 600 nm.

The method of the invention is not limited to irradiation with light which includes ultra violet wavelengths and may be carried out using, for example, irradiation with sunlight or natural light. If natural light is employed, a longer process time may be required for destruction of contaminants but this may be outweighed in some circumstances by the convenience of employing natural light.

In accordance with a preferred embodiment, light of continuous polychromatic output between 200 and 500 nm is employed. A suitable source is a Solarchem 1 kW broad band medium pressure mercury lamp or other source emitting light in the region below 500 nm.

The exemplary apparatus of FIG. 1 may be employed to carry out the process of the invention. The apparatus may be used in batch or flow through mode and may be scaled up as required. Other arrangements of apparatus may be used, as will be understood by those skilled in the art.

The following examples are provided to illustrate the process of the invention and the invention is not limited thereto.

EXAMPLE 1

Treatment was carried out at ambient temperature in the apparatus of FIG. 1 which had a working tank of 23 L capacity and a reactor of 6 L containing a Solarchem 1 kW lamp housed in a quartz sleeve.

The apparatus was filled with 29 L tap water which was charged with 3.5 mL each of benzene, toluene and xylene. The mixture was circulated for one hour at 75 liters/min to ensure that the organics were completely dissolved. After this time, the working tank head space was blown out with nitrogen gas for about five minutes to remove any undissolved organics in the head space, and a sample of the solution was taken for baseline analysis. Ferric sulfate (110 ppm) and oxalic acid (270 ppm) were dissolved in water (50 ml), giving 0.103 g/L ferric oxalate. The ferric oxalate solution was added to the treatment apparatus with circulation at 75 Lpm, the lamp was ignited and, after warm-up (25 seconds), 44 ml hydrogen peroxide (35% w/w) was added to give 600 ppm $H_2O_2$.

Samples were taken at regular intervals and all samples were analyzed for benzene, toluene and xylene by HPLC.

Figure 2:
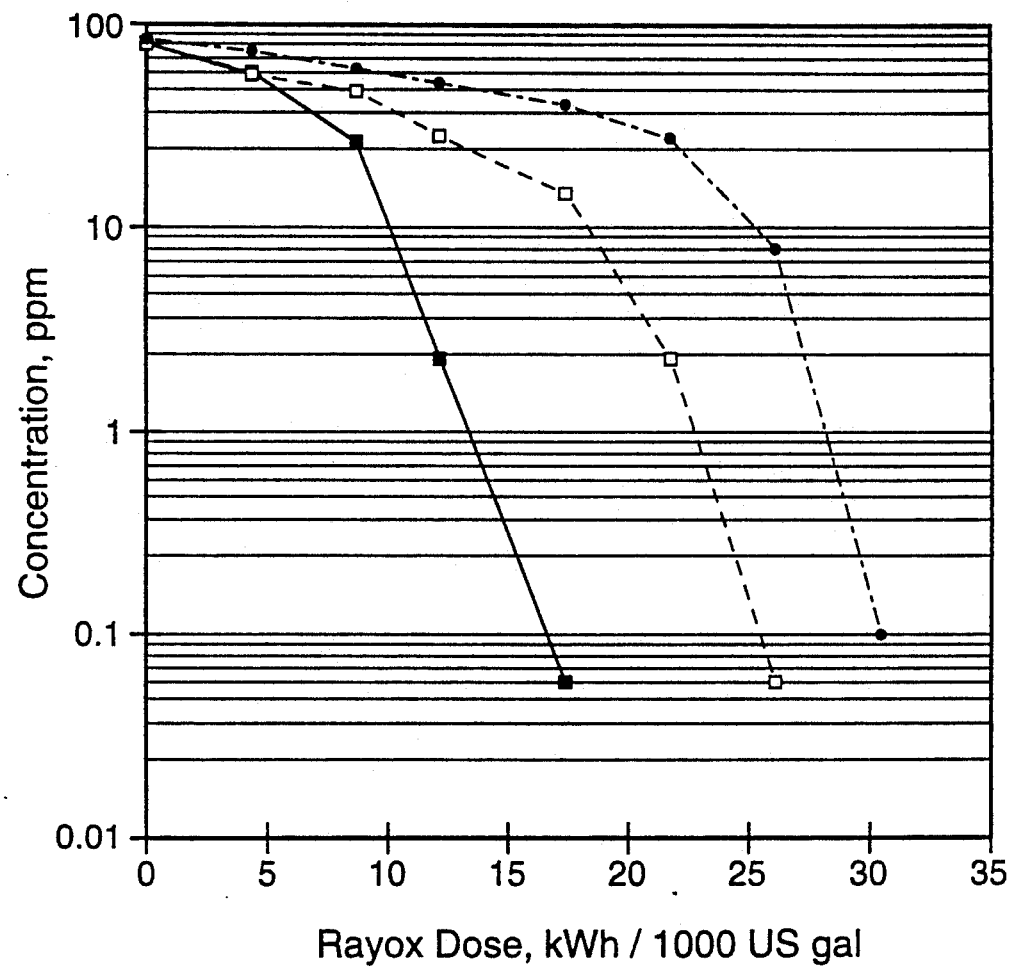
FIG. 2 shows the rate of benzene destruction with $UV/H_2O_2$/ferric oxalate (—■—), $UV/H_2O_2$/ferrous sulfate (--☐--) and $UV/H_2O_2$/ferric sulfate (—♦—) treatment systems.

FIG. 2 shows the benzene degradation obtained by this treatment (—■—). Similar results were obtained with toluene and xylene.

Similar benzene/xylene/toluene solutions were treated by a similar procedure but using either ferric sulfate (0.143 g/L) or ferrous sulfate (0.109 g/L) as iron source instead of ferric oxalate. These non-organic iron salts were added directly to the treatment solution in the apparatus.

Benzene degradation with ferric sulfate (—♦—) or ferrous sulphate (--□--) is shown in FIG. 2.

Results with xylene and toluene were similar to those with benzene for all three procedures.

An industrial sample of BTX water was treated by the same procedure and showed similar destruction of benzene, toluene and xylene. In addition, the COD of the BTX water was reduced.

EXAMPLE 2

The procedure of Example 1 was repeated for a variety of pollutants. Experiments were conducted on the effect of ferric oxalate on pollutant degradation compared to ferrous sulfate and also to treatment with UV/peroxide with no iron added. Table 1 summarizes the results, normalised to the rate for UV/peroxide treatment which was taken as 1. Note: BTX=benzene, toluene, xylenes; MTBE=methyl t-butyl ether; TCE=trichloroethylene; PCE=tetrachloroethylene; $CHCl_3$=chloroform; MEK=methylethyl ketone. BTX components were analysed by HPLC and all other by gas chromatography.

TABLE 1

| Pollutant | Initial Conc. (mg/ml) | Relative Rate | | |
|---|---|---|---|---|
| | | $UV/H_2O_2$ | $FeSO_4$ | Fe oxalate |
| BTX | 70 each | 1* | 1.9* | 3.5* |
| MTBE | 100 | 1 | 1.5 | 2.3 |
| TCE | 100 | 1 | 1.4 | 2.2 |
| PCE | 100 | 1 | 1.3 | 2.2 |
| $CHCl_3$ | 100 | 1 | 0.7–1 | 0.7–1 |
| MEK | 100 | 1 | 2.0 | 2.5 |
| Dioxane | 100 | 1 | 1.3 | 2.6 |
| Phenol | 100 | 1 | 4.9 | 11.3 |

*Relative rate is average of those of benzene, toluene and xylene.

EXAMPLE 3

A sample of BTX plus MTBE water was treated according to the procedure of Example 1 at four pH values, with analysis of components as in Example 2. The results are summarised in Table 2, rates being normalised to that observed at pH 6.5, relative rates of destruction for the various components being expressed as a range.

TABLE 2

| pH | Relative Rate |
|---|---|
| 6.5 | 1 |
| 4–5 | 2–3 |
| 3–4 | 5–6 |
| 1 | 2 |

EXAMPLE 4

A test sample containing 100 ppm 1,4-dioxane was treated by the procedure of Example 1, comparing different ratios of oxalate:iron. The results are shown in Table 3.

TABLE 3

| oxalate:Fe (III) ratio | Relative Rate |
|---|---|
| 3:1 | 1 |
| 12:1 | 0.7 |

The present invention is not limited to the features of the embodiments described herein, but includes all variations and modifications within the scope of the claims.

I claim:

1. A method for treating an aqueous waste or groundwater containing organic contaminants comprising
   a) contacting the aqueous waste or groundwater at an acidic pH with effective amounts of hydrogen peroxide and ferric oxalate, and
   b) irradiating the aqueous waste or groundwater with light in an amount effective to decompose the organic contaminants.

2. A method in accordance with claim 1 wherein hydrogen peroxide is added in an effective amount based on the concentration of organic contaminants in the aqueous waste or groundwater and ferric oxalate is added in an amount consistent with iron discharge requirements, the method further comprising the step of adding oxalic acid or suitable oxalate salt in an effective amount at suitable effective time intervals to regenerate ferric oxalate.

3. A method in accordance with claim 1 wherein the waste or groundwater is contacted with ferric oxalate by adding thereto oxalic acid or a suitable oxalate salt and a suitable ferric salt to generate ferric oxalates.

4. A method in accordance with claim 1 wherein hydrogen peroxide and ferric oxalate are added initially in effective amounts based on the concentration of the organic contaminants in the aqueous waste or groundwater.

5. A method in accordance with claim 4 wherein the light is natural light.

6. A method in accordance with claim 4 wherein the light is of a wavelength or wavelengths in the range of about 200 nm to about 600 nm.

7. A method in accordance with claim 6 wherein the light is of a wavelength or wavelengths in the range of about 200 nm to about 500 nm.

8. A method in accordance with claim 4 wherein the organic contaminants are at least one member selected from the group consisting of aromatic hydrocarbons; substituted aromatic hydrocarbons; phenols, substituted phenols; substituted and unsubstituted alkanes, alkenes and alkynes; ethers and substituted ethers; ketones and substituted ketones.

9. A method in accordance with claim 8 wherein the organic contaminants are at least one member selected from the group consisting of benzene, toluene, xylene, methyl t-butyl ether, trichloroethylene, tetrachloroethylene, methylethyl ketone, dioxane and phenol.

10. A method in accordance with claim 4 wherein the light is polychromatic light of wavelengths from about 200 nm to about 600 nm.

11. A method in accordance with claim 10 wherein the light is polychromatic light of wavelengths from about 200 nm to about 500 nm.

12. A method in accordance with claim 10 wherein the acidic pH is in the range of about 2 to about 5.

13. A method in accordance with claim 12 wherein the pH is in the range of about 2 to about 4.

14. A method in accordance with claim 13 wherein ferric oxalate is present in a concentration which gives an iron concentration in the range of about 1 to 100 ppm and an oxalate concentration in the range of about 5 to about 500 ppm.

* * * * *

UNITED STATES PATENT AND TRADEMARK OFFICE
CERTIFICATE OF CORRECTION

PATENT NO. : 5,266,214
DATED : November 30, 1992
INVENTOR(S) : Ali SAFARZEDEH

It is certified that error appears in the above-indentified patent and that said Letters Patent is hereby corrected as shown below: In column 6, after line 61, In the claims, please add the following claims 15-19:

-- 15. A method in accordance with claim 2 wherein the light is sunlight.

16. A method in accordance with claim 3 wherein the light is sunlight.

17. A method in accordance with claim 15 wherein the pH is in the range of about 1 to about 5 and wherein ferric oxalate is present in a concentration which gives an iron concentration in the range of about 1 to about 100 ppm and an oxalate concentration in the range of about 5 to about 500 ppm.

18. A method in accordance with claim 17 wherein the pH is in the range of about 2 to about 4.

UNITED STATES PATENT AND TRADEMARK OFFICE
CERTIFICATE OF CORRECTION

PATENT NO. : 5,266,214
DATED : December 22, 1992
INVENTOR(S) : Ali SAFARZEDEH It is certified that error appears in the above-identified patent and that said Letters Patent is hereby corrected as shown below:

19. A method in accordance with claim 1 wherein the waste or groundwater is contacted with ferric oxalate by adding thereto oxalic acid or a suitable oxalate salt and a suitable ferrous salt to generate ferric oxalate.--

Signed and Sealed this

Seventeenth Day of May, 1994

Attest:

BRUCE LEHMAN

*Attesting Officer*    *Commissioner of Patents and Trademarks*